May 30, 1967 E. E. KEITH 3,322,894

HORIZONTAL OSCILLATOR FOR TELEVISION RECEIVERS

Filed Nov. 22, 1963 2 Sheets-Sheet 1

INVENTOR.
Emerald Eugene Keith
BY
Lockwood, Woodard, Smith & Weikart
Attorneys

INVENTOR.
Emerald Eugene Keith
BY
Lockwood, Woodard, Smith & Weikart
Attorneys

United States Patent Office 3,322,894
Patented May 30, 1967

3,322,894

HORIZONTAL OSCILLATOR FOR TELEVISION RECEIVERS

Emerald Eugene Keith, Fort Wayne, Ind., assignor to The Magnavox Company, Fort Wayne, Ind., a corporation of Delaware Filed Nov. 22, 1963, Ser. No. 325,605
10 Claims. (Cl. 178—7.3)

This invention relates generally to television receivers and more particularly to an improvement in automatic frequency control for the horizontal oscillator operating from a low B+.

For television horizontal oscillators, it is desirable that the A.F.C. have a linear characteristic through a range of from 500 cycles above the standard 15,750 cycles per second to 500 cycles below the standard. It is also desirable to avoid excessive retrace time and to avoid having the A.F.C. too sensitive. It has also been found desirable to operate TV receivers with low values of B+ such as 100 to 150 volts, for example.

In conventional ringing coil stabilized multivibrators used in a TV receiver operating at low values of B+, it is very difficult to obtain a linear A.F.C. This results in an unbalanced pull-in condition which is difficult, if not impossible, to overcome.

It is therefore, a general object of the present invention to provide an improved horizontal oscillator for television receivers.

A further object is to provide a horizontal oscillator operable with low values of B+ and yet having the desired A.F.C. characteristics.

It is a still further object of the present invention to provide an improved horizontal oscillator having a short retrace time.

The full nature of the invention will be understood from the accompanying drawings and the following description and claims.

Figures 1, 2, 3:
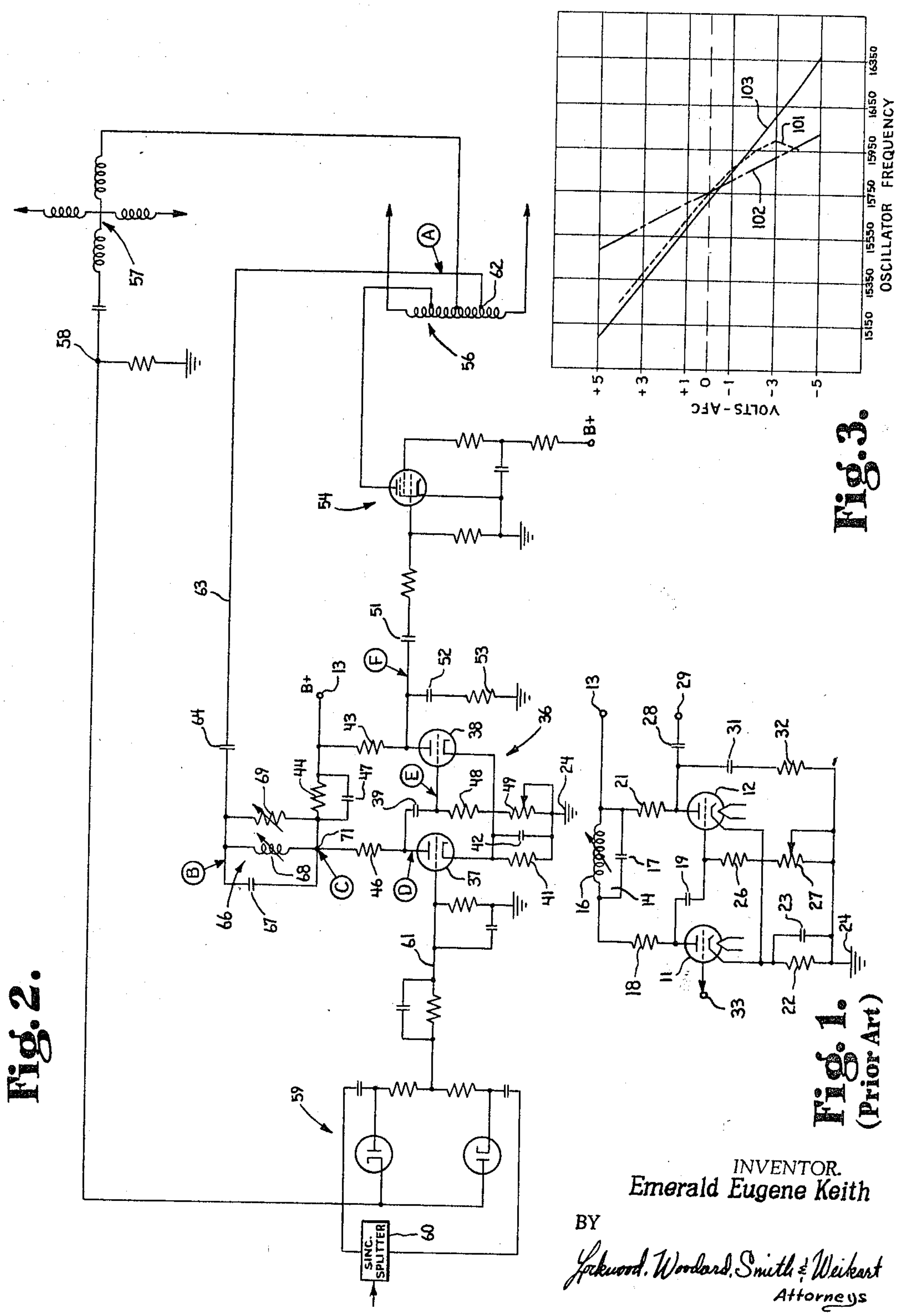
Fig. 2. Fig. 3. Fig. 1. (Prior Art)
FIG. 1 is a schematic diagram of a conventional ringing coil stabilized multivibrator.
FIG. 2 is a schematic diagram showing a typical embodiment of the present invention.
FIG. 3 is a graph showing typical A.F.C. response curve for the conventional oscillator of FIG. 1 compared to two typical A.F.C. response curves for the circuit of the present invention, the latter two curves illustrating different sensitivity characteristics which can be obtained by changing circuit component values.
Figure 4A:
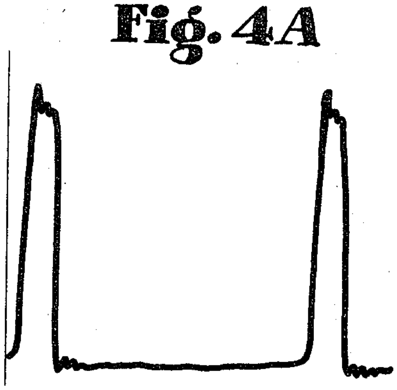
Figure 4B:
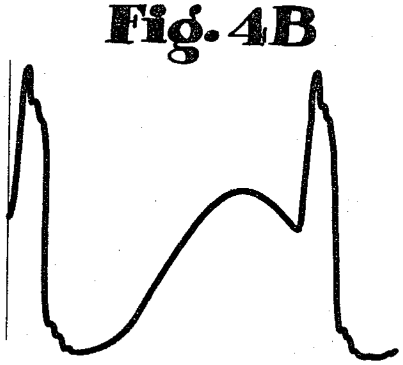
Figure 4C:
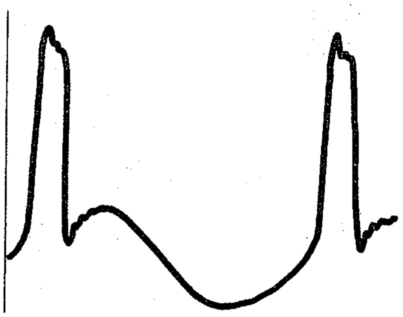
Figure 4D:
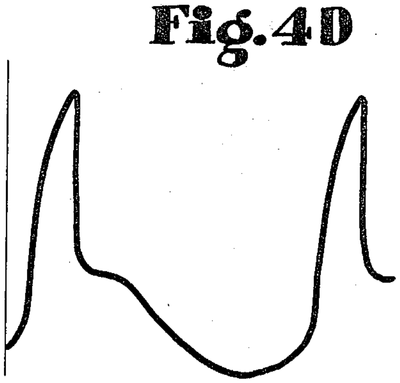
Figure 4E:
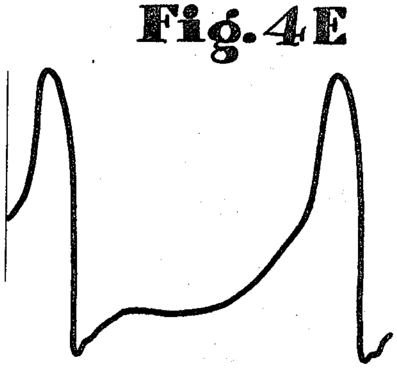
Figure 4F:
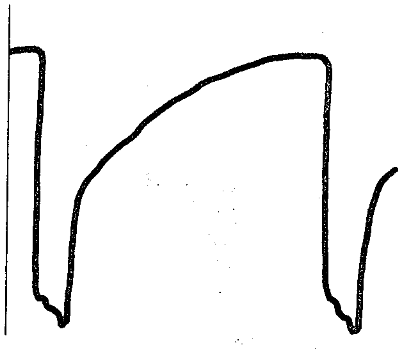

FIG. 4A thru 4F show waveforms at various locations in the circuit of FIG. 3 indicated by corresponding reference letters.

Described briefly, a typical embodiment of the present invention comprises a ringing coil stabilized multivibrator operating at a low value of B+, a phase detector comparing the phase difference between sync pulses from a sync splitter and the horizontal retrace pulse derived from the horizontal output transformer through the horizontal deflection yoke, and means coupling large amplitude pulses from the horizontal output transformer to the ringing coil circuit on the multivibrator to provide large ringing coil voltages independent of oscillator currents through the stabilizing circuit, and thereby accommodating component selection to establish good switching for the multivibrator.

Referring to the drawings in detail, and particularly the prior art showing of FIG. 1 thereof, a ringing coil stabilized multivibrator is shown having a first triode 11 and a second triode 12, with the cathodes thereof being directly coupled together. A B+ potential is supplied at the point 13, and could typically be on the order of 270 volts. However, it is desirable that it be only 150 volts.

A tuned circuit 14 comprising the inductor 16 and capacitor 17 is connected between the terminal 13 and the resistance 18, the tuned circuit normally being tuned to the standard horizontal sweep frequency of 15,750 cycles per second. The resistance 18 is connected to the plate of tube 11, the plate being also coupled through the capacitor 19 to the grid of the tube 12. Resistance 21 is coupled between the terminal 13 and the plate of tube 12. A resistance 22 and capacitor 23 in parallel are connected between the common cathode connection of the tubes and ground 24.

Fixed rlesistance 26 and variable resistance 27 are connected between ground and the grid of tube 12, the resistance 27 being usually used for the horizontal "hold" control.

The output of the oscillator is derived from the plate of tube 12 through the capacitor 28 and is present at the terminal 29. A capacitor 31 and resistor 32 are connected in series between the plate of tube 12 and ground, producing an output signal of generally the sawtooth type. Typically, the output signal passes to the horizontal output stage to provide the horizontal sweep signal at the horizontal output transformer and horizontal deflection yoke of the television receiver.

A.F.C. control signals at the grid 33 of the tube 11 are derived from a phase detector which obtains a signal from the output stage as well as from the sync splitter of a television receiver in a manner well known in the art.

In this conventional circuit, resistor 18 controls the pulse amplitude applied to the grid of tube 12, with the stabilizing voltage from the ringing circuit 14 depending on the "Q" of the circuit 14. To obtain good switching of the grid of tube 12, resistor 18 should be large to develop a large switching pulse. The trouble with making resistance 18 large is that it reduces current through the circuit 14 and thereby reduces the developed sine wave. Furthermore, it further removes the grid of tube 12 from the stabilizing source. Consequently, when this type of oscillator is operating at a low B+, if resistance 18 is increased to provide good switching for the grid of tube 12, stabilization is reduced. This changes the slope of the A.F.C. response curve resulting in an undesirable increase in sensitivity.

In this conventional circuit, resistance 22 should be large to provide signal coupling between the stages but not so large as to cause tube 11 to operate in a nonlinear grid voltage to plate current characteristic. Therefore, in order to obtain the desired linearity in such an oscillator when operating at low B+, resistance 22 must be made smaller than normal. This gives poor interstage coupling and reduces the amount of A.F.C. voltage that the oscillator can handle. It also increases the oscillator sensitivity.

A further difficulty with the conventional circuit of FIG. 1 is that linearity cannot be effectively improved by changing the value of capacitor 23 without introducing some other undesired effect. For example, linearity can be improved by increasing the value of capacitor 23. However, this causes an increase in the output signal retrace time, with consequent loss of the C.R.T. anode high voltage.

Referring now to FIG. 2, illustrating a typical embodiment of the present invention, the oscillator 36 is a cathode coupled multivibrator having much the same appearance as that in FIG. 1. It includes the tubes 37 and 38 with the plate of tube 37 coupled through capacitor 39 to the grid of tube 38. The cathodes of these tubes are coupled to ground 24 through the resistance 41 and capacitance 42 in parallel. A B+ potential of 150 volts, for example, is supplied at terminal 13 which is coupled through the resistance 43 to the plate of tube 38. Terminal 13 is also coupled through the resistances 44 and 46 to the plate of tube 37. A capacitor 47 is connected in parallel with resistance 44. Fixed resistance 48 and variable resistance 49 are connected in series between ground 24 and the grid of tube 38. Variable resistance 49 is used for the horizontal hold control.

The oscillator output is derived from the plate of tube 38 through the capacitor 51. A capacitor 52 and resistor 53 are connected between ground and the plate of tube 38 to produce an output waveform of generally a sawtooth variety.

The oscillator output is coupled to the horizontal output tube 54 which is coupled in turn to the horizontal output transformer 56.

The horizontal sweep signal is derived from the horizontal output transformer and coupled to the horizontal deflection yoke 57. This signal is sampled at junction 58 from which it is fed back to the double diode phase detector 59 to which positive and negative sync pulses are applied from the sync splitter 60 in a manner well known in the art. Phase difference between the sync pulses and the horizontal sweep signal results in a control voltage on the detector output at 61 which is coupled to the grid of the tube 37 of the oscillator.

According to the present invention, the horizontal output transformer is tapped at 62 providing a feedback path 63 through capacitor 64 to the top of the ringing circuit 66. The ringing circuit includes the capacitor 67 and coil 68 and a resistance 69 is connected thereacross. This combination is connected to the top of resistor 46.

A large amplitude pulse (Waveform "A," FIG. 4) is produced at the horizontal output transformer tap. It is coupled through capacitor 64 to the ringing coil circuit and shock excites the circuit to the fundamental frequency thereof, which is normally established at the standard 15,750 c.p.s. frequency.

Resistance 69 is useful to control the amplitude of oscillations in the ringing coil circuit and a large sine wave voltage with superimposed pulse (Waveform "C," FIG. 4) can thereby be developed at the junction 71. This sine wave voltage in conjunction with the normal B+ fed through resistances 44 and 46 controls the plate voltage (Waveform "D," FIG. 4) for tube 37.

In operation, upon initial turn on of the B+, current flows through resistances 44 and 46 causing the grid of tube 38 to rise in potential. This causes increased cathode current due to the greater plate current in tube 38. The grid current also contributes to the cathode current. The increased cathode current through resistor 41 causes tube 37 to be cut off.

As capacitor 39 approaches total charge through resistances 44 and 46, tube 38 cannot maintain the current flow because of the combined effects of the voltage drop across resistance 43 which reduces the plate voltage of tube 38, and the increasing current flow through resistance 41 which increases the negative bias on tube 38, and because of the nonlinear charging characteristic of capacitor 39. Consequently, the current flow through tube 38 collapses.

With no current flow through tube 38, current through resistor 41 is terminated. This removes the cathode bias from tube 37 and allows it to conduct through the plate load resistances 44 and 46 and the cathode resistance 41. The voltage drop produced across resistance 41 keeps tube 38 cut off until the charge on capacitor 39 has leaked off through resistances 48 and 49 to a value which will allow tube 38 to again conduct. When tube 38 again conducts, the cycle repeats.

During the time tube 38 is cut off, capacitor 52 is charged through resistor 43 and resistor 53. When tube 38 again conducts, capacitor 52 discharges. This results in a peaked sawtooth wave being developed at the plate of tube 38 which is applied through the capacitor 51 and the resistance in series to the grid of the horizontal output tube 54.

The horizontal output tube is coupled through the output transformer 56 to the C.R.T. horizontal deflection yoke 57. The tap 62 on the output transformer provides a sharp pulse of the order of 600 to 700 volts peak to peak. This large amplitude pulse is coupled through capacitor 64 to the parallel circuit combination of capacitors 67, coil 68, and resistor 69. It is this which produces a large sine wave with a superimposed pulse (Waveform "C," FIG. 4) at the junction 71. By way of example, the signal appearing at the junction 71 may have a value on the order of 110 volts peak-to-peak. The D.C. voltage at this point may be on the order of 145 volts. The ringing coil circuit is, of course, tuned to the standard horizontal scan line rate.

Phasing and wave shape of voltages derived from the L-C-R combination 68, 67, and 69, augment at the junction 71, the source of voltage for the multivibrator circuit. Since the ringing circuit is resonant at the line scan rate, it provides the plate of tube 37 and the grid of tube 38 stabilization voltages (Waveforms "D" and "E" respectively) at the same line rate.

Because of the method of introducing oscillator stabilization according to this invention, the plate load resistance 46 can be made much larger than normal, which, along with a large positive pulse introduced with the stabilizing sine wave at the junction 71, provides good switching for the grid of tube 38.

The advantages of the present invention can now be appreciated. As described above, with reference to FIG. 1, it was desirable to increase the value of resistance 18 in order to improve the switching of tube 12. However, the disadvantage in increasing the value of resistance 18 was that it reduced stabilization. In the new circuit of FIG. 2 however, resistor 46 may be given the value necessary for proper switching of tube 38 without detrimentally affecting stabilization. This is because stabilization in the new circuit is not dependent on oscillaton currents through the stablizing circuit but is assured because the ringing circuit is shocked into oscillation by a large amplitude external pulse. The degree of control of the oscillator depends on the amplitude of the sine wave component and this is controlled readily by the resistance 69 across the ringing circuit.

It was mentioned with regard to the conventional circuit of FIG. 1, that resistor 22 must be made smaller than normal in oscillators operating at low B+, in order to obtain linearity. However, this gave poor interstage coupling reducing the amount of A.F.C. voltage that the oscillator could handle and therefore increased the oscillator sensitivity. However, in the circuit of the present invention, the effective plate voltage for tube 37 is increased due to the method of stabilization. Therefore, the value of resistance 41 can be made higher than otherwise possible. This provides good cathode coupling between the two tubes and greater A.F.C. control with improved A.F.C. linearity. Therefore, it is not necessary to increase the value of the capacitor 42 in order to obtain linearity. This preserves the minimum desired retrace time.

Typical examples of values for the various components in FIG. 2 are as follows:

| | | |
|---|---|---|
| Tubes 37 and 38 | | One 6CG7 |
| Resistor 69 | | 39K |
| Resistor 44 | | 5.6K |
| Resistor 46 | | 12K |
| Resistor 43 | | 82K |
| Resistor 41 | | 1.5K |
| Resistor 53 | | 12K |
| Resistor 48 | | 56K |
| Resistor 49 | | 25K |
| Capacitor 67 | mfd. | .002 |
| Capacitor 64 | mfd. | .001 |

| | | |
|---|---|---|
| Capacitor **47** | mfd. | .0039 |
| Capacitor **39** | mmfd. | 470 |
| Capacitor **42** | mfd. | .001 |
| Capacitor **52** | mmfd. | 620 |
| Capacitor **51** | mfd. | .01 |

In FIG. 2, curve 101 is an example of the type of A.F.C. response obtained from the circuit of FIG. 1 when operating at a B+ of 150 volts. Curve 102 is a typical A.F.C. response curve for the new oscillator of FIG. 2 incorporating the values listed above. Curve 103 is a curve illustrating greater A.F.C. sensitivity which can be obtained with the circuit of FIG. 2 when several of the values are changed as follows:

| | |
|---|---|
| Resistor **69** | 18K |
| Resistor **46** | 22K |
| Resistor **48** | 39K |
| Resistor **49** | 16K |

This illustrates the excellent linearity which can be maintained even though several circuit values are changed substantially.

In the conventional circuit, the stabilizing circuit is in series with a D.C. source, load resistor, and tube plate, with changes of tube current shocking the L–C circuit into oscillations. The tube, B+, and plate load resistance of the first tube affect the magnitude of stabilization wave form at the grid of the second tube. In contrast, the circuit of the present invention uses an externally shock excited stabilization circuit making it possible to achieve effective switching, ease of controlling stabilization, maintaining or reducng the retrace time, and extending A.F.C. linearity over a greater range than heretofore possible.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In an automatic frequency control system, the combination comprising: an oscillator adapted to produce a periodic output signal; pulse producing means coupled to said oscillator and producing pulses in response to said output signal; a ringing circuit independent of said oscillator and external thereto and coupled to said oscillator; and means coupling said pulses from said pulse producing means to said ringing circuit thereby shock exciting said ringing circuit into oscillation independent of currents in said oscillator and at a predetermined frequency, said ringing circuit thereupon applying to said oscillator a sine wave voltage with said pulses superimposed thereon and thereby stabilizing the oscillation frequency of said oscillator at the oscillation frequency of said ringing circuit.

2. In a horizontal synchronizing system for a television receiver and the like, the combination comprising: an oscillator adapted to produce a periodic output signal; a horizontal output stage driven by said oscillator; control means having synchronizing signal input means and having second input means coupled to said output stage for receiving a first signal caused by said oscillator, said control means being adapted to apply control potentials to said oscillator in response to a phase variation between the synchronizing signal and said first signal; a ringing circuit coupled to said oscillator for frequency stabilization and tuned to a predetermined frequency; and means coupling said output stage to said ringing circuit to receive from said output stage a pulse signal caused by said oscillator and apply said pulse signal to said ringing circuit to shock said ringing circuit to oscillate at said predetermined frequency and thereby stabilize said oscillator output signal at said predetermined frequency.

3. In a horizontal synchronizing system for a television receiver and the like, the combination comprising: an oscillator adapted to produce a periodic output signal at a predetermined frequency, said oscillator having an electron discharge switching device thereon with a load circuit and a control electrode; a horizontal output stage driven by said oscillator and including a horizontal output transformer providing a sawtooth signal in a horizontal deflection yoke; control means having inputs for synchronizing signals of opposite polarity and having an input coupled to said yoke for receiving said sawtooth signal, said control means being adapted to apply control potentials to said oscillator in response to a phase variation between the synchronizing signals and said sawtooth signal; a ringing circuit coupled to the said load circuit for frequency stabilization of said oscillator and tuned to said predetermined frequency; and means coupling said transformer to said ringing circuit to provide pulses shock exciting said ringing circuit to oscillate at its fundamental frequency.

4. In a horizontal synchronizing system for a television receiver and the like, the combination comprising: an oscillator adapted to produce a periodic output signal at a predetermined frequency; a horizontal output stage driven by said oscillator and including a horizontal output transformer providing a sawtooth signal in a horizontal deflection yoke; control means having inputs for synchronizing signals of opposite polarity and having an input coupled to said yoke for receiving said sawtooth signal, said control means being adapted to apply control potentials to said oscillator in response to a phase variation between the synchronizing signals and said sawtooth signal; a ringing circuit coupled to said oscillator for frequency stabilization thereof and tuned to said predetermined frequency; and means coupling said transformer to said ringing circuit to provide pulses shock exciting said ringing circuit to oscillate at its fundamental frequency.

5. The system as set forth in claim 4 wherein: said oscillator is a cathode coupled multivibrator having first and second electron tubes, and having a first resistance connected between said ringing circuit and plate of said first tube, said plate being capacitively coupled to a control electrode of said second tube; said ringing circuit being coupled between said first resistance and a tap on said output transformer.

6. A television receiver oscillator system comprising: a multivibrator having a first tube and a second tube; a ringing circuit external to said multivibrator and coupled through first resistance and first capacitance means to the control electrode of said second tube; a source of direct current electrical energy of constant potential coupled in a first direct current series circuit with the load current path of said first tube and in a second direct current series circuit with the load current path of said second tube, said ringing circuit being excluded from said series circuits but connected to said first series circuit; resistance means in parallel with said ringing circuit; and pulse generating means connected to said ringing circuit and applying a high amplitude pulse input to said ringing circuit to shock said circuit into oscillation for producing a high stabilization voltage at the control electrode of said second tube.

7. In a horizontal synchronizing system for a television receiver and the like, the combination comprising: a multivibrator having first and second electron discharge devices, each having a load circuit and a control electrode, with the load circuit of said first device coupled to the control electrode of said second device; a ringing circuit independent of said load circuits of said first and second devices and connected to the load circuit of said first device to control switching of said second device, said ringing circuit being tuned to a predetermined frequency; an output stage couple to the load circuit of said second device and driven by said multivibrator to produce sharp ılses; and means coupling said pulses from said output age to said ringing circuit and thereby shock exciting ıid ringing circuit into oscillation at said frequency, the ‹citation of said ringing circuit being independent of cur- ›nts in said load circuits.

8. In a horizontal synchronizing system for a television ›ceiver and the like, the combination comprising: a ıultivibrator having first and second electron discharge evices, each having a load circuit and a control elec- ode, with the load circuit of said first device coupled › the control electrode of said second device; a ringing ircuit excluded from direct current series connection in ıid load circuits of said first and second devices and onnected to the load circuit of said first device to con- :ol switching of said second device, said ringing circuit eing tuned to a predetermined frequency; means for es- ablishing a predetermined "Q" of said ringing circuit › establish a desired degree of control of switching of aid second device; an output stage coupled to the load ircuit of said second device and including an output ransformer producing output pulses in response to oscil- ation of said multivibrator; and means coupling said ›ulses from said output transformer to said ringing cir- :uit to shock excite said ringing circuit into oscillation ıt said frequency, the excitation of said ringing circuit ›eing independent of currents in said load circuits.

9. In a horizontal synchronizing system for a television :eceiver and the like, the combination comprising: a :athode coupled multivibrator having first and second ›lectron tubes, each tube having a load circuit and a :ontrol grid, with the load circuit of said first tube in- :luding a first resistance coupled to the plate of said first tube and coupled to a source of positive direct current potential, said plate being coupled through a first capacitor to the control grid of said second tube; a ringing circuit excluded from direct current series connection in said load circuits and connected through said first resistance and said first capacitor to the said grid of said second tube to control switching of said second tube, said ringing circuit being tuned to a predetermined frequency; means for adjusting the "Q" of said ringing circuit to establish a desired degree of control of switching of said second tube; an output stage coupled to the load circuit of said second tube and including an output transformer producing output pulses in response to oscillation of said multivibrator; and means coupling said pulses from said output transformer to said ringing circuit to shock excite said ringing circuit into oscillation at said frequency, the excitation of said ringing circuit being independent of currents in said load circuits.

10. In an automatic frequency control system, the combination comprising: a cathode coupled multivibrator having first and second electron tubes, each tube having a load circuit and a control electrode, with the load circuit of said first tube including a first resistance coupled to the plate of said first tube and coupled to a source of positive direct current potential, said plate being coupled through a first capacitor to the control electrode of said second tube; pulse producing means coupled to the load circuit of said second tube and responsive thereto to produce a high amplitude pulse for every cycle of operation of the multivibrator; a ringing circuit external to said load circuits and connected through said first resistance and said first capacitor to said control electrode of said second tube to control switching of said second tube, said ringing circuit being tuned to a predetermined frequency; and means coupling said pulse from said pulse producing means to said ringing circuit to excite said ringing circuit into oscillation at said predetermined frequency independent of currents in said load circuits.

References Cited

UNITED STATES PATENTS

| | | | |
|---|---|---|---|
| 2,708,689 | 5/1955 | Vonderschmitt | 178—69.5 |
| 2,873,369 | 2/1959 | Kraft | 331—20 |
| 3,046,490 | 7/1962 | Marshall | 331—1 |

DAVID G. REDINBAUGH, *Primary Examiner.*

R. L. RICHARDSON, *Assistant Examiner.*